(12) United States Patent
Okumura et al.

(10) Patent No.: US 6,373,538 B2
(45) Date of Patent: *Apr. 16, 2002

(54) REFLECTION TYPE COLOR LIQUID CRYSTAL DEVICE AND METHOD FOR DRIVING THE SAME USING A COLOR FILTER

(75) Inventors: Osamu Okumura; Toshiharu Matsushima; Tsuyoshi Maeda, all of Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/983,252
(22) PCT Filed: May 23, 1997
(86) PCT No.: PCT/JP97/01759
§ 371 Date: Jan. 20, 1998
§ 102(e) Date: Jan. 20, 1998
(87) PCT Pub. No.: WO97/45766
PCT Pub. Date: Dec. 4, 1997

(30) Foreign Application Priority Data

May 24, 1996 (JP) .............................................. 8-130431

(51) Int. Cl.[7] ............................................ G02F 1/1335
(52) U.S. Cl. ........................................ 349/106; 349/113
(58) Field of Search ................................ 349/106, 108, 349/113, 116, 96; 430/7

(56) References Cited

U.S. PATENT DOCUMENTS

| | | | | |
|---|---|---|---|---|
| 5,541,749 A | * | 7/1996 | Konuma et al. | 349/106 |
| 5,587,819 A | * | 12/1996 | Sunohara et al. | 34/106 |
| 5,661,531 A | * | 8/1997 | Greene et al. | 349/73 |
| 5,699,135 A | * | 12/1997 | Hisatake et al. | 349/113 |
| 5,734,457 A | * | 3/1998 | Mitsui et al. | 349/106 |

FOREIGN PATENT DOCUMENTS

| | | |
|---|---|---|
| GB | 2 139 372 A | 11/1984 |
| JP | U-61-124082 | 8/1986 |
| JP | A-5-173122 | 7/1993 |
| JP | 05241143 | 9/1993 |
| JP | A-6-95099 | 4/1994 |
| JP | A-7-270611 | 10/1995 |
| JP | A-8-129169 | 5/1996 |

\* cited by examiner

Primary Examiner—Toan Ton
(74) Attorney, Agent, or Firm—Oliff & Berridge, PLC

(57) ABSTRACT

Reflection type color liquid crystal device, which can display bright and clear colors, is provided. Further, this reflection type liquid crystal device is configured so that a first substrate provided with a transparent electrode, and a second substrate provided with a transparent electrode and a color filter are placed in such a manner as to face each other. Moreover, a pair of polarizing plates are placed at both sides of the substrates thereacross. Furthermore, a reflector plate is provided outside of one of the pair of the polarizing plates. The color filter is composed of filter elements respectively corresponding to the subtractive primaries, namely, yellow, cyan and magenta.

18 Claims, 11 Drawing Sheets

REFLECTION TYPE COLOR LIQUID CRYSTAL DEVICE AND METHOD FOR DRIVING THE SAME USING A COLOR FILTER

FIELD OF THE INVENTION

The present invention relates to a reflection type liquid crystal display device, and to a method for driving a reflection type color liquid crystal device.

BACKGROUND TECHNOLOGY

A display equipped in a portable information terminal should be of the low power consumption type. Thus, a reflection type liquid crystal device, which does not need back light, is most suited for such an application. However, the dominating conventional reflection type liquid crystal device is of the monochromatic display type. Therefore, good reflection type color display has not been obtained yet.

Full-scale development of the reflection type color liquid crystal device was started about the middle of 1980's. There had been only a superficial understanding before then. For example, the reflection type color display could be obtained by replacing the backlight unit of the transmission type color liquid crystal device.

However, when the liquid crystal device is actually made of such a configuration, it has been found that only very dark display could be achieved and that the device of such a configuration was not practical. There have been three causes. First, the polarizing plate has discarded more than half of the quantity of light. Second, the color filter has discarded more than ⅔ of the quantity of light. Finally, there has been the problem of a parallax. Parallax has been the inevitable problem in the case of TN (twisted nematic) mode and STN (supertwisted nematic) mode. This is because of the fact that two polarizing plates are necessarily used in these modes and thus there is a distance created between the reflector plate and the liquid crystal layer, which cannot be disregarded, unless the polarizing plates are not built in a cell. Incidentally, the problem of the parallax referred to herein is not the problem of a double-image in the display which has occurred even in the conventional reflection type monochromatic liquid crystal device. Namely, the parallax is a problem that occurs in and is peculiar to the reflection type color liquid crystal device.

Problems of parallax will be described hereunder by referring to the accompanying drawings. FIGS. 7(a) and 7(b) are sectional views of a reflection type color liquid crystal device utilizing TN mode or STN mode. This liquid crystal device consists of an upper polarizing plate 1. an upper glass substrate 2, a liquid crystal layer 3, a lower glass substrate 4, a lower polarizing plate 5, an optical reflector plate 6 and red-green-blue (RGB) three-color filter 7. Additionally, there are transparent electrodes, an orientation film and insulating film between the upper and lower glass substrates. These composing elements are, however, unnecessary for describing the problem of a parallax. Thus, the drawing thereof is omitted.

Meanwhile, there are two problems with the parallax. First, one of the two problems is color cancellation. As shown in FIG. 7(a), an observer 32 watches reflection light 31 having passed through a green filter. This reflection light has been mixed with incident light 30 which has been incident thereon through the red-green-blue color filter and has been diffused and reflected by the reflector plate. If the thickness of the lower glass substrate 4 is sufficiently large in comparison with the pitch of filter elements of the color filter 7, a light ray propagated through any color filter element is mixed with the reflection light 31 with same probability.

However, the light of any wavelength, which has passed through the paths "red to green" and "blue to green", is inevitably absorbed by one of the filter elements. Thus, only the light having passed through the path "green to green" remains. This is the same with reflection light rays having transmitted from the blue and red filter elements. Consequently, the brightness of displayed white is decreased to ⅓ that of the case in which there is no parallax.

A second problem is that the displayed colors become dark. FIG. 7(b) illustrates a green displaying state. Further, the cross hatched portion of the liquid crystal layer 3 indicates that such a portion is in a non-illuminated state (namely, a dark state). Incident light 30 passes through each of red, green and blue dots with the same probability. However, ⅔ of the quantity of the incident light 30 are absorbed by the red and blue dots which are in an off-state. Furthermore, after diffused by the reflector plate 6 and mixed with the reflection light, ⅔ of the quantity of such light are absorbed by the red and blue dots which are put into the off-state again. Then, the light reaches the observer 32. Therefore, the brightness of the display of green is obtained by subtracting the quantity of light, which is absorbed by the green filter element, from ⅑ of the brightness of the displayed white (namely, ⅑ of the brightness of the display of white—the quantity absorbed by the green filter element), and thus becomes very dark.

As is understood from the foregoing description, it is very difficult to apply TN mode and STN mode, in each of which the problem of the parallax occurs, to the reflection type color liquid crystal device.

Thus, hitherto, attempts have been made to obtain bright reflection type color displays by changing the liquid crystal mode.

For example, according to the article by Mr. Tatsuo Uchida et al. (IEEE Transactions on Electron Devices, Vol ED-33, No. 8, pp. 1207–1211 (1986)), as illustrated in FIG. 2 therein, the comparisons of the brightness among various liquid crystal modes are made. As a consequence, PCGH (Phase-Change type Guest Host) mode, which does not need polarizing plates, is employed. Furthermore, in the case of the Japanese Unexamined Patent Publication No. 5-241143 Official Gazette, PDLC (Polymer-Dispersed type liquid crystal) mode, which does not require the polarizing plates, is employed so as to realize a reflection type color liquid crystal device.

In the case of using the liquid crystal mode which does not need polarizing plates, there are obtained the merits in that the absorption of light by the polarizing plate is eliminated and that the problem of the parallax can be settled completely by providing a reflector plate in such a manner so as to be adjacent to the liquid crystal layer.

However, on the other hand, in the case of the liquid crystal modes requiring no polarizing plates, the contrast is usually low. Further, especially, PCGH mode has encountered the problem in that halftone display cannot be performed owing to the presence of a hysteresis in the voltage-transmittance characteristic. Furthermore, these liquid crystal modes, by which foreign substance is added to the liquid crystal, have encountered the problem in degradation in the reliability.

Therefore, TN mode and STN mode, which have been widely used heretofore and achieved satisfactory results, are the best modes to be employed, if can be used even in the aforementioned conditions.

Additionally, hitherto, attempts have been made to obtain a bright reflection type color display by using the bright color filter. An example of this is disclosed in the Japanese Unexamined Patent Publication NO. 5-241143 Official Gazette. In this case, a reflection type color liquid crystal device is configured by using a color filter consisting of filter elements respectively corresponding to the subtractive primaries, namely, yellow, cyan and magenta.

This method has profound effects in obtaining bright displays but has faced the following problems.

Namely, ordinary color liquid crystal devices perform the additive mixing process by using a set of small color points, and thus use the color filter consisting of filter elements respectively corresponding to the additive primaries, namely, red, green and blue. However, according to the aforementioned Official Gazette, the additive mixing process is performed by using the color filter corresponding to the subtractive primaries. Thus, the degree of the color saturation of the displayed color is low, and the clear display cannot be achieved. Incidentally, according to the same Official Gazette, PDLC mode, which does not use polarizing plates, is employed. In addition, no parallax is caused as a result of providing the reflection plate at a place adjacent to the liquid crystal layer across the color filter.

SUMMARY OF THE INVENTION

Accordingly, an object of the present invention is to provide a reflection type liquid crystal device which can obtain a bright display by using a color filter consisting of filter elements respectively corresponding to Yellow, cyan and magenta, and can display bright colors in comparison with the conventional devices by making good use of parallax.

In accordance with the present invention, there is provided a preferable embodiment of a reflection type color liquid crystal device, which has a liquid crystal cell, in which a liquid crystal layer is held between a first substrate provided with a transparent electrode and a second substrate provided with a transparent electrode and a color filter, wherein the liquid crystal cell is placed between a pair of polarizing plates, wherein an optical reflector plate is formed outside one of the substrates, and wherein the aforementioned color filter comprises filter elements respectively corresponding to subtractive primaries that are yellow, cyan and magenta color elements, and wherein the lowest transmittance of the color filter, which correspond to each of the color elements, is not less than 10%.

Thus, the reflection type color liquid crystal device, which realizes a bright and clear display, can be obtained by setting the lowest transmittance of the color filter, which corresponds to each of the color elements, as being not less than 10%. Generally, the range of wavelengths from 400 to 770 nm is referred to as the visible region. Especially, the human visual sensitivity is high in the range of wavelengths from 450 to 660 nm. Therefore, a bright and clear display can be attained by setting the transmittance of the color filter correspondingly to each of all of the color elements as above described.

Further, regarding the color filter, the lowest transmittance thereof corresponding to each of the color elements in the visible region is set at a value within a range of 15% to 25%.

Further, a preferable embodiment of the reflection type color liquid crystal device of the present invention is adapted so that the spectrum representing a transmission characteristic of the aforesaid yellow filter element intersects with the spectrum representing a transmission characteristic of the aforesaid magenta filter element at a wavelength being close to 500 nm, wherein the spectrum representing a transmission characteristic of the aforesaid cyan filter element intersects with the spectrum representing a transmission characteristic of the aforesaid magenta filter element at a wavelength being close to 600 nm, and wherein these two points of intersection are present in a range where a transmittance is not less than 30%. More preferably, the aforesaid color filter is formed so that the two points of intersection are present in a range where the transmittance is 35% to 60%.

Moreover, a preferable embodiment of the reflection type color liquid crystal device of the present invention is adapted so that a distance between the optical reflector plate and the color filter is set as being larger than the pitches of dots formed by the aforesaid electrode. More preferably, the distance between the optical reflector plate and the color filter is set as being twice to three times each of the dot pitches. Incidentally, it is not desirable that the thickness of the glass substrate becomes larger than 0.7 mm. This is because the double image of the display is conspicuous. With such a configuration, the color saturation of the displayed colors is enhanced by the subtractive mixing which utilizes the parallax.

Furthermore, a preferable embodiment of the reflection type color liquid crystal device of the present invention is adapted so that a pixel electrode is placed on one of the aforesaid substrates in such a manner as to be formed like a matrix, and that a switching element is formed by being connected to the aforesaid pixel electrode. Thus, a high-precision display reflection type color liquid crystal device can be obtained.

Furthermore, a preferable embodiment of a reflection type color liquid crystal device, which has a liquid crystal cell, in which a liquid crystal layer is held between a first substrate provided with a reflector electrode and a second substrate provided with a transparent electrode and a color filter, wherein the liquid crystal cell is placed between a pair of polarizing plates, wherein an optical reflector plate is formed outside one of the substrates, and wherein the aforementioned color filter comprises filter elements respectively corresponding to subtractive primaries that are yellow, cyan and magenta color elements, and wherein the lowest transmittance of the color filter, which correspond to each of the color elements, is not more than 10% in a visible region.

Thus, the reflection layer (namely, the reflector electrode) is placed close to the liquid crystal layer.

Generally, the range of wavelengths from 400 to 770 nm is referred to as the visible region. Especially, the human visual sensitivity is high in the range of wavelengths from 450 to 660 nm. Therefore, a bright and clear display can be attained by setting the transmittance of the color filter correspondingly to each of all of the color elements in a visible range (400 to 770 nm) as above described.

Moreover, a reflection type color liquid crystal device can be obtained by placing an optical diffusion plate between the second substrate and the polarizing plate.

Furthermore, regarding the color filter, the lowest transmittance thereof corresponding to each of the color elements in the visible region is set at least 20% or more and, more preferably, 30% or more.

On the other hand, a preferable embodiment of the reflection type color liquid crystal device of the present invention is adapted so that the spectrum representing a transmission characteristic of the aforesaid yellow filter element intersects with the spectrum representing a transmission characteristic of the aforesaid magenta filter element at a wavelength being close to 500 nm, wherein the spectrum representing a transmission characteristic of the aforesaid cyan filter element intersects with the spectrum representing a transmission characteristic of the aforesaid magenta filter element at a wavelength being close to 600 nm, and wherein these two points of intersection are present in a range where a transmission is not less than 30%. More preferably, the aforesaid color filter is formed so that the two points of intersection are present in a range where the transmittance is 35% to 60%.

By using such a color filter, a bright display reflection type color liquid crystal device can be obtained.

Moreover, a preferable embodiment of the reflection type color liquid crystal device of the present invention is adapted so that a distance between the optical reflector plate and the color filter is set as being larger than the pitches of dots formed by the aforesaid electrode. More preferably, the distance between the optical reflector plate and the color filter is set as being twice to three times each of the dot pitches. Incidentally, it is not desirable that the thickness of the glass substrate becomes larger than 0.7 mm. This is because the double image of the display is conspicuous.

With such a configuration, the color saturation of the displayed colors is enhanced by the subtractive mixing which utilizes the parallax.

Furthermore, a preferable embodiment of the reflection type color liquid crystal device of the present invention is adapted so that a pixel electrode is placed on one of the aforesaid substrates in such a manner so as to be formed like a matrix, and that a switching element is formed by being connected to the aforesaid pixel electrode. Thus, a clearer display reflection type color liquid crystal device can be obtained.

Additionally, correspondingly to a preferable embodiment of the reflection type color liquid crystal device of the present invention, there is provided a method of driving the aforementioned reflection type color liquid crystal device, wherein, when displaying any color with the exception of black, a plurality of dots are turned on or partially turned on among 3 dots corresponding to each of the aforesaid yellow, cyan and magenta. In other words, only in the case of displaying black, 3 dots are non-illuminated. In the case of displaying 3 colors such as red, green and blue, 2 dots are turned on. In the case of other colors, all of 3 dots are turned on or partly illuminated. Incidentally, the turning-on is defined as an operation of changing the liquid crystal device into a bright state. Further, non-illuminating is to put the liquid crystal device into a dark state. Furthermore, an operation of partly turning on is to put the liquid crystal device into an intermediate state between the bright and dark states. With such a configuration, the reflection type color liquid crystal device can realize an extremely bright display. Further, the intermediate display can be achieved. Thus, the present invention has an advantage in that full color display can be attained.

Furthermore, by mounting the reflection type color liquid crystal device on the electronic devices, lower power consumption electronic device can be obtained.

BEST MODE FOR CARRYING OUT THE INVENTION

The configuration of a device of the present invention may be considered to be similar to that of the reflection type liquid crystal device disclosed in the aforementioned Japanese Unexamined Patent Publication No. 5-241143 Official Gazette. Indeed, these liquid crystal devices are similar in respect of the fact that a subtractive-primaries color filter is used.

However, in the case of the device of the present invention, such a filter is applied to liquid crystal modes, such as TN-mode and STN-mode, in which an occurrence of parallax cannot be prevented. Such an application of the filter brings new advantageous effects, such as effects of mitigating the problems of parallax and of enhancing color purity by performing a subtractive process, in addition to the effect of simply brightening up.

Figure 8A:
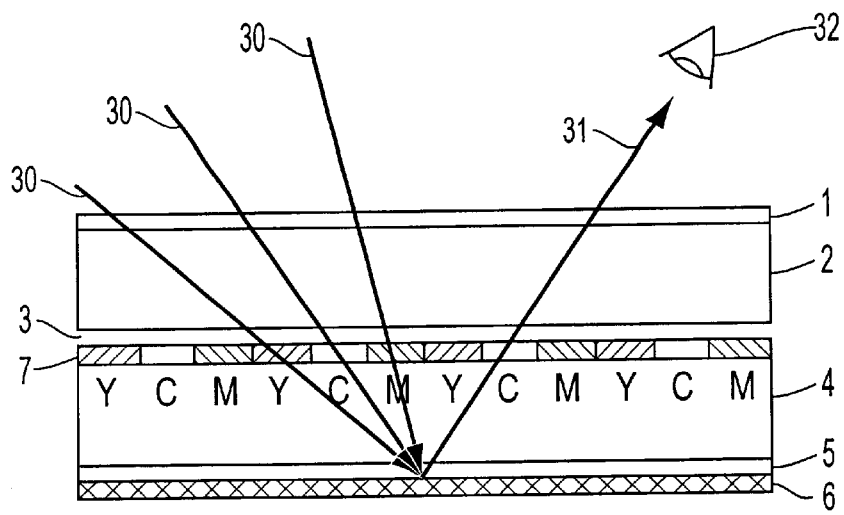
FIGS. 8(a) and 8(b) are a sectional view of a reflection type color liquid crystal device of the present invention utilizing TN mode or STN mode, which is drawn for illustrating the problems of parallax.
Figure 8B:
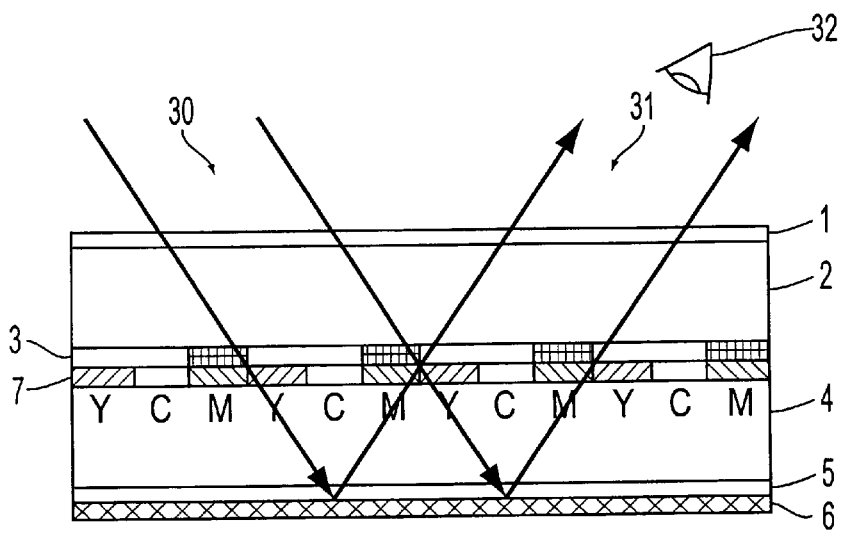

Such new advantageous effects will be described hereinbelow by referring to the drawings. FIGS. 8(a) and 8(b) are sectional views of a reflection type color liquid crystal device utilizing TN mode or STN mode. This liquid crystal device is composed of an upper polarizing plate 1, an upper glass substrate 2, a liquid crystal layer 3, a lower glass substrate 4, a lower polarizing plate 5, an optical reflector plate 6, and a yellow-cyan-magenta primaries color filter 7. In addition, there are transparent electrodes, an orientation film and an insulating film between the upper and lower glass substrates. However, these composing elements are unnecessary for the description of the problems of parallax and thus the drawing of these composing elements is omitted.

Meanwhile, the first problem relating to the parallax is color cancellation. As illustrated in FIG. 8(a), reflection light 31 observed by an observer 32 is a mixture of light rays having propagated through the following three paths among color dots: "yellow to cyan"; "magenta to cyan"; and "cyan to cyan". A part of light having passed through the path "yellow to cyan" among these paths is absorbed and thus is green. Further, light having passed through the path "magenta to cyan" among these paths is red. However, different from the case of using the red-green-blue color filter, it does not become completely dark. Thus, although the brightness in the case of displaying white is decreased to ⅓ of that in the case of no parallax when using the red-green-blue color filter, the brightness in the case of displaying white is decreased to ⅔ of that in the case of no parallax when using a yellow-cyan-magenta color filter.

Further, the second problem of parallax resides in that the color display becomes dark. FIG. 8(*b*) illustrates a green displaying state. Further, a cross hatched portion in the liquid crystal layer 7 indicates that such a portion is in a unilluminated state (or in a dark state). In the case of displaying green with the yellow-cyan-magenta filter, yellow and cyan color dots are put into an illuminated state (namely, in a bright state), and magenta color dots are brought into the unilluminated state (namely, in the dark state). Thus, ⅓ of incident light 30 is absorbed by magenta dots which are in an off-state. Further, after being diffused by the optical reflector plate and mixed, ⅓ of the incident light is absorbed by the magenta dots which are in the off-state and then reaches the observer 32. Therefore, the brightness in the case of displaying green is obtained as follows: "⁴⁄₉ of the brightness in the case of displaying white—a part of that to be decreased owing to the absorption by the cyan and yellow dots". Consequently, the brightness in the case of displaying green is higher than that in the case of using the red-green-blue filter.

In addition, a result of the detailed examination of the paths of light in the case of displaying green reveals that there are the following four kinds of paths: "cyan to cyan", "yellow to yellow", "cyan to yellow" and "yellow to cyan". In the case of the latter two of these paths, the light passes through both of the yellow and cyan dots, so that a subtractive color mixture condition occurs.

Namely, owing to the effects of the parallax, both of the additive color mixture due to a planar set of color points and the subtractive color mixture due to a three-dimensional overlap of color points are simultaneously produced. When using yellow-cyan-magenta (namely, subtractive primaries) color filter, an effect of enhancing the degree of the color saturation of displayed color is obtained by configuring the device in such a manner as to cause parallax.

Figure 9:
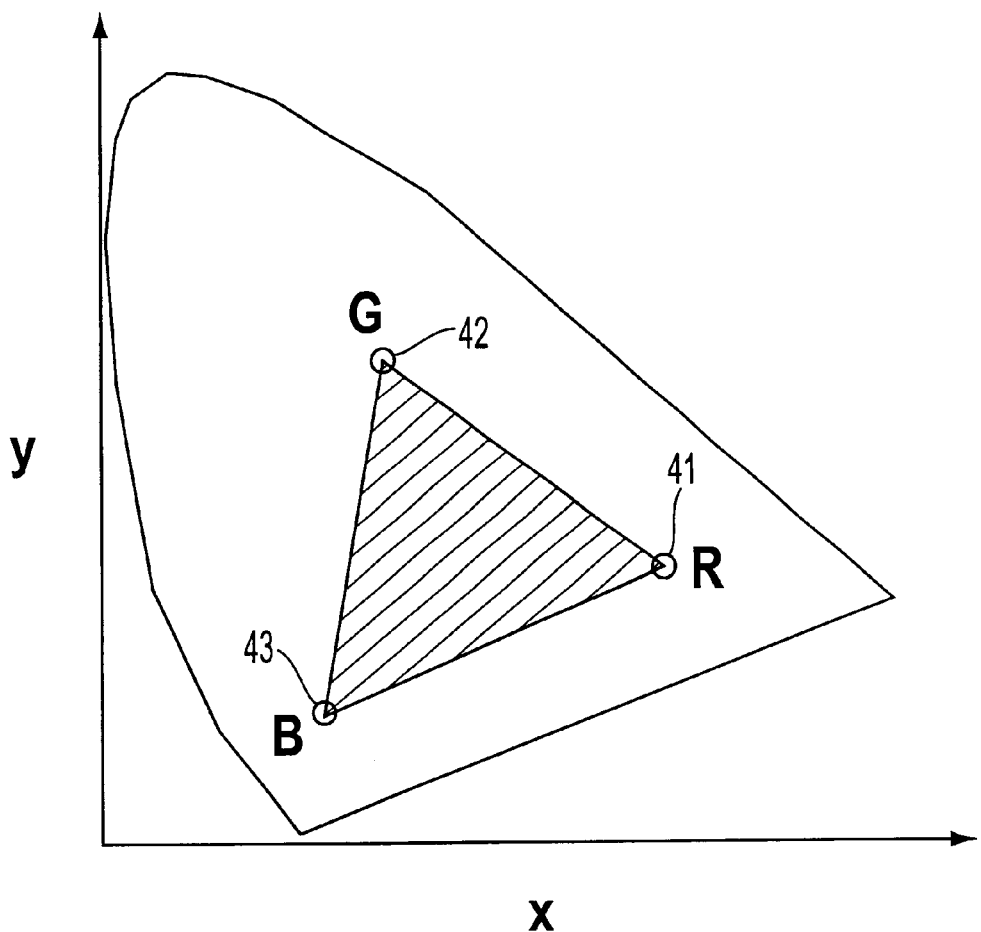
FIG. 9 is a graph illustrating display colors of the conventional reflection type color liquid crystal device using red-green-blue color filters.

Next, a method of driving the device will be described hereinbelow. FIG. 9 is a graph illustrating the displayed colors in the case of a conventional color liquid crystal device using the red-green-blue filter. Needless to say, in the case of displaying a single color, reference numerals 41, 42 and 43 designate displayed colors in the case of displaying a single color of red, green and blue, respectively. Needless to say, in the case of displaying a single color, only one dot is illuminated (namely, the bright display thereof is performed) among three dots composing one pixel. When the gradation levels of the color dots are determined by performing a halftone correction in this device according to NTSC primary color signals respectively corresponding to red, green and blue, colors corresponding to the hatched area in this figure can be displayed.

Figure 10:
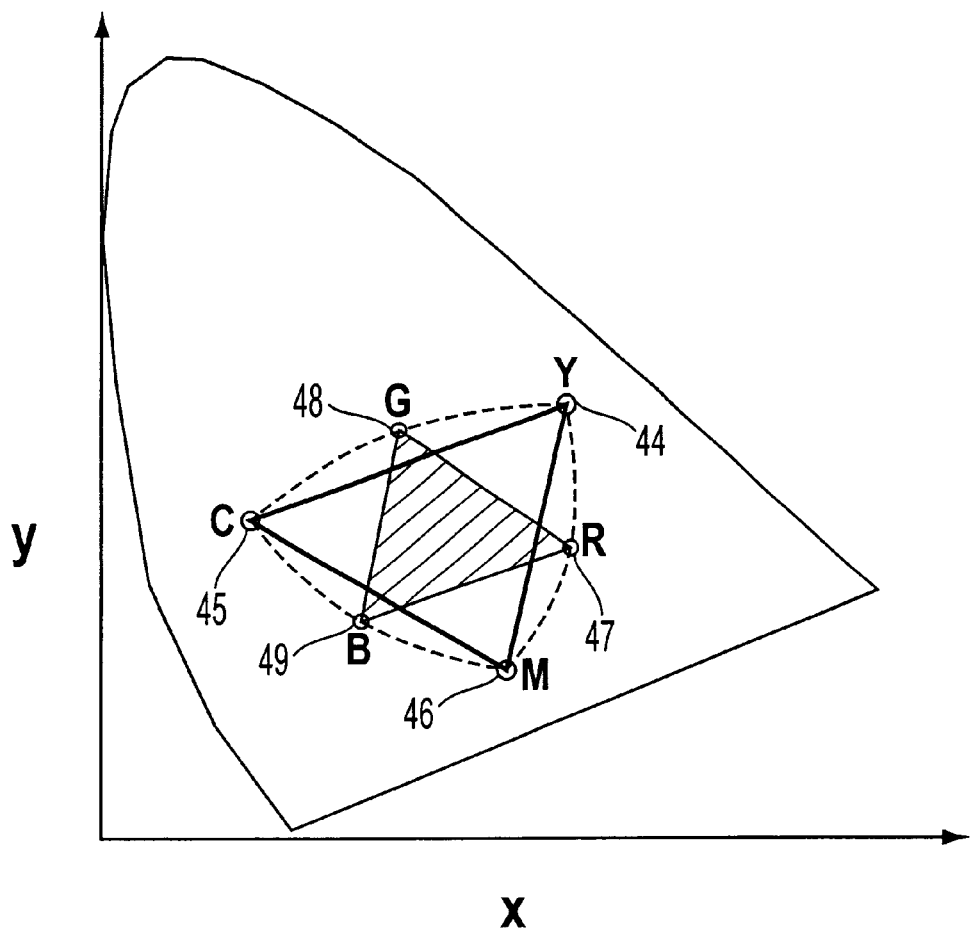
FIG. 10 is a graph illustrating display colors of a reflection type color liquid crystal device using yellow-cyan-magenta filters.

On the other hand, FIG. 10 is a diagram illustrating the displayed colors of the reflection type color liquid crystal device using the yellow-cyan-magenta filter. Reference numerals 44, 45 and 46 designate displayed colors in the cases of displaying a single color of yellow, cyan and magenta, respectively. When driving this device similarly as in the case of the conventional device, colors included in a triangle having vertexes 44, 45 and 46 of this figure can be displayed. Incidentally, in the case that there is a parallax, the subtractive color mixture results owing to the previously described effects. Range of displayed colors is expanded to that indicated by dashed lines in this figure.

However, it is assumed that only the colors included in the hatched area in the triangle having the vertexes 47, 48 and 49 are displayed in the case of the device of the present invention. This is because of the fact that two dots or more of three dots of each pixel are illuminated (except in the case of displaying black) in the case of the displayed colors in this range and thus the bright color display is obtained for the reason described above with reference to FIG. 8(*b*). Therefore, when displaying, for example, yellow, lighter colors are utilized, which are obtained by turning on all yellow dots but a part of cyan dots and a part of magenta dots, instead of 44 colors which are obtained by turning on a single yellow dot. Thus, about ¾ of the displayable colors are not utilized. Although this may be considered to be inefficient, this has great merits in that a bright and well-balanced display can be obtained.

In the case of the reflection type color liquid crystal device of the present invention, first, a high-contrast display is ensured by employing a liquid crystal display mode using the polarizing plate. In addition, this is combined with the subtractive-primaries color filter, so that a bright display is obtained.

Although there are many liquid crystal display modes using polarizing plates, liquid crystal display modes by which bright and black-and-white displays can be realized, for example, TN mode proposed in the Japanese Patent Publication No. 51-013666 Official Gazette, STN mode of the phase difference plate compensation type proposed in the Japanese Patent Publication No. 3-50249 Official Gazette and a nematic liquid crystal mode proposed in the Japanese Unexamined Patent Publication No. 6-235920 Official Gazette which performs a bi-stable switching operation, are suited for the purpose of the present invention. Among these modes, TN mode is extremely superior in respect that a bright and high-contrast display can be obtained. On the other hand, the degree of the sharpness of the voltage-transmittance characteristic is low. Moreover, it is necessary for driving the device of TN mode to place an expensive MIM or TFT element at each dot (or each pixel). Incidentally, STN mode of the phase difference compensation type is more suitable for driving an inexpensive simple matrix.

Further, the liquid crystal mode using only a single polarizing plate, for instance, a single polarizing plate type nematic liquid crystal mode proposed in the Japanese Unexamined Patent Publication Nos. 3-223715 and 4-97121 Official Gazettes, and a single polarizing plate type hybrid orientation nematic liquid crystal mode announced in a lecture No. 3A19 of the 21th liquid crystal panel discussion (1995) can be utilized. Each of these liquid crystal display modes uses only a single polarizing plate. Thus, a shade in the display can be eliminated by placing the reflector plate in such a manner so as to be close to a liquid crystal layer or a color filter layer. Incidentally, in this case, there is the necessity for a contrivance to perform mirror finish on the reflector plate and to provide a diffusing plate on the outer surface of the glass substrate to thereby cause a parallax and improve the displayed colors.

Hereinafter, the present invention will be described in detail by referring to the drawings.

(Embodiment 1)

Figure 1:
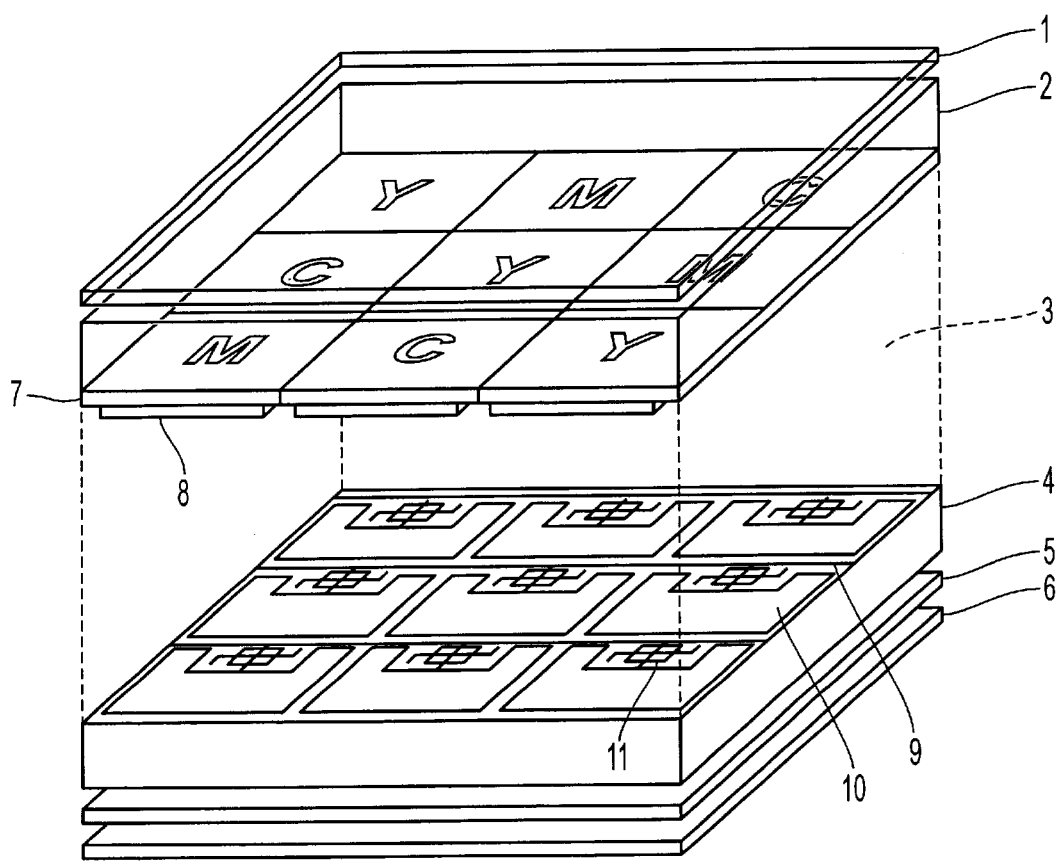
FIG. 1 is a diagram illustrating a primary part of the configuration of a reflection type color liquid crystal device of the present invention.

FIG. 1 is a diagram illustrating a primary part of a reflection type color liquid crystal device according to the exemplary embodiment of the invention.

Reference numeral 1 denotes an upper polarizing plate; 2 an upper glass substrate; 3 a liquid crystal layer; 4 a lower glass substrate; 5 a lower polarizing plate; and 6 an optical reflector plate. Signal line 9, a pixel electrode 10 and MIM element 11 are formed on the lower glass substrate. Incidentally, each of the pairs of elements (1 and 2; 4 and 5; and 5 and 6) are drawn as being separated from each other in this figure. This is conducted for the reader's clear and ready understanding of the present invention. Actually, such composing elements of each of the pairs are glued by using a paste. Further, the upper glass substrate 2 and the lower glass substrate 4 are drawn as being spaced far away from each other. This is conducted for the same reason. Actually, these substrates face each other across a gap of several $\mu$m to ten-odd $\mu$m or so.

Moreover, in this figure, the simplified configuration is described. Namely, 3×3=9 dots are illustrated. Actually, in a liquid crystal panel consisting of opposed one pair of substrates (2, 4), 480×1920=921600 dots are formed. Incidentally, the number of dots of the reflection type color liquid crystal device of the present application is not limited thereto. The present invention can be applied to any reflection type color liquid crystal device as long as the device has a plurality of dots.

Counter electrodes 8 and pixel electrodes 10 are constituted by transparent electrodes. In the case of this embodiment, the electrodes are constituted by ITO. Signal line 9 is formed by using a metal Ta. MIM element has a structure in which an insulating film $Ta_2O_5$ is interposed between the metals Ta and Cr. Thickness of the lower glass substrate is 0.7 mm. The dot pitch (namely, the pitch between each pair of adjacent pixels) in each of the longitudinal and transverse directions is 0.16 mm. Incidentally, TFT may be employed as a switching element.

The thickness of the liquid crystal layer and that of the electrodes are negligible in comparison with that of the lower glass substrate. Thus, the distance between the optical reflector plate and the color filter is 4.4 times the dot pitch.

Liquid crystal layer 3 is made of twisted nematic liquid crystals whose twist angle is 90°. Thickness of the liquid crystal and that of the liquid crystal layer are set in such a manner that the product of the birefringence anisotropy of the refractive index ($\Delta$n) of the liquid crystal and the thickness (d) of the liquid crystal layer, namely, the retardation ($\Delta$n×d) is equal to 0.48 $\mu$m. Moreover, the upper and lower polarizing plates are set so that the axis of absorption thereof is nearly parallel with the rubbing axis of an adjacent substrate. This is the configuration of the brightest TN mode.

Further, the color filter 7 consists of elements respectively corresponding to the subtractive primaries, namely, yellow (indicated by "Y" in this figure), cyan (indicated by "C" in this case) and magenta (indicated by "M" in this figure). The color filter is formed outside the display area. For example, the color filter is formed in the same arrangement as in the drive area outside the display area (namely, the drive area) and by the border of the bezel opening area. As a result of placing the color filters in this way, the peripheral portion and the drive portion have the same brightness. The darkness of the drive portion is inconspicuous. Furthermore, even when the liquid crystal device is not driven, a display state in which there is no sense of incongruity to observers can be obtained.

Incidentally, in the case of the reflection type color display device of the present invention, no black mask is formed between adjoining color filters.

Figure 2:
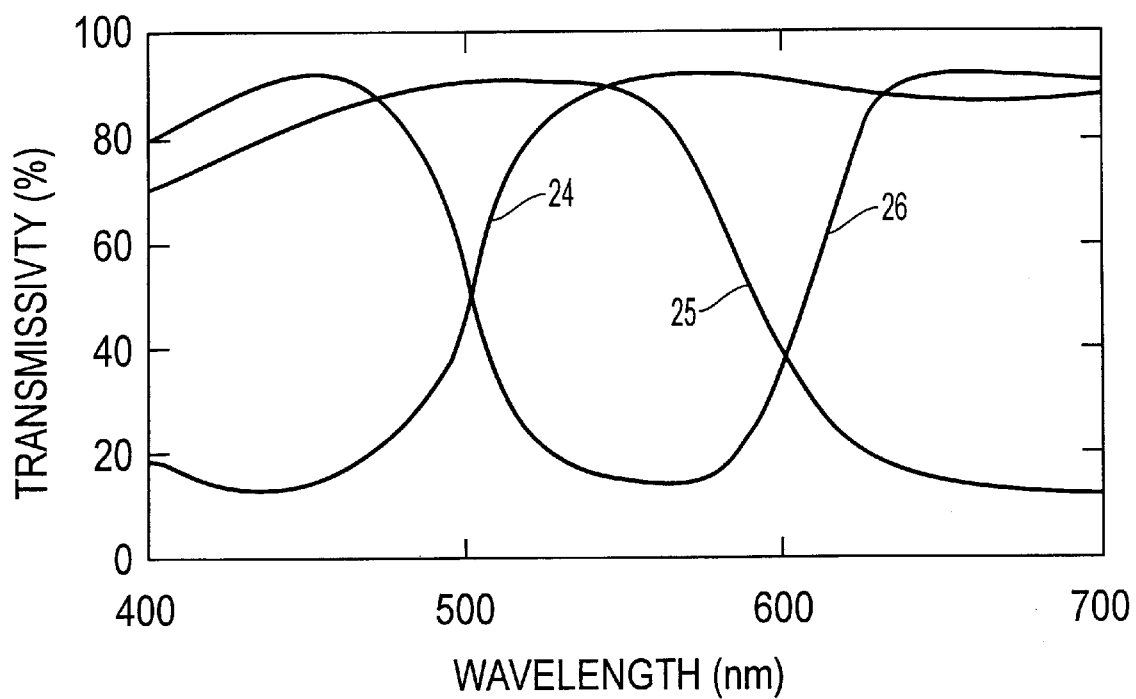
FIG. 2 is a graph illustrating a spectral characteristic of a color filter of the reflection type color liquid crystal device of the present invention.

FIG. 2 is a graph showing the spectral characteristic of the color filter 7. The horizontal axis represents the wavelength of light (in nm); and the vertical axis the transmittance (in %). Reference numeral 24 designates the spectrum of the yellow filter element; 25 that of the cyan filter element; and 26 that of the magenta filter element. The transmittance characteristic of each color filter element is indicated by the corresponding spectrum illustrated in FIG. 2. These spectra are measured by using a microspectrophotometer. The spectra are measured at the color-filter-side single substrate. Then, the transmittance of each of the glass substrates and the transparent electrodes is corrected and adjusted to 100%. In the following cases, the spectral characteristics of the color filter were measured by this method. This color filter has transmittance of 10% or more correspondingly to all of the wavelengths in the range of 450 to 660 nm. Incidentally, FIG. 2 shows that the lowest transmittance is 10% in the wavelength range (generally, in the visible region) of 400 to 700 nm.

Figure 3:
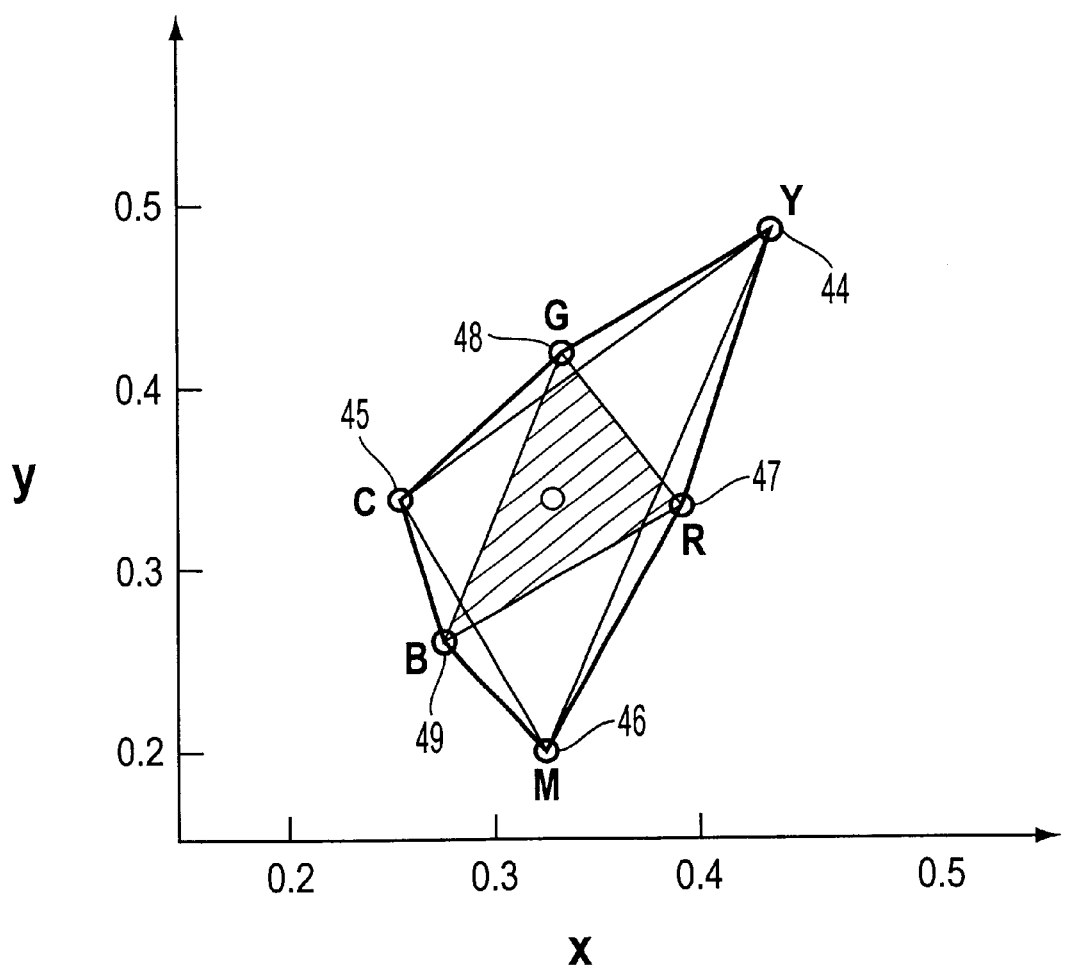
FIG. 3 is a graph illustrating the display colors of the reflection type color liquid crystal device of the present invention.

FIG. 3 is a graph illustrating the displayed colors of the reflection type color liquid crystal device of "Embodiment 1". This figure is an X-Y chromaticity diagram. A display range of the reflection type color liquid crystal device of the present application is indicated by using this X-Y chromaticity diagram.

Reference numerals 44, 45 and 46 designate displayed colors respectively corresponding to the cases of singly displaying yellow, cyan and magenta. Needless to say, in this case, only one dot is turned on (namely, the bright display thereof is performed) among three dots composing one pixel.

Further, reference numerals 47, 48 and 49 designate the displayed colors respectively corresponding to the cases of singly displaying red, green and blue. The reference numeral 49 denotes a vertex placed outside a triangle having vertexes 44, 45 and 46 and indicates that the subtractive color mixture occurs concurrently with the additive color mixture and that the color purity is enhanced. Incidentally, the measurement of the displayed colors is performed by irradiating the liquid crystal panel from all directions by using an integrating sphere having a diameter M of 120 mm, the inner surface of which is coated with barium sulfate, and directing the light, which is reflected in the direction normal to the panel, into a spectrometer.

A change in the displayed color, which is produced when the thickness of the lower glass substrate is diversely changed from 0 mm to 1.1 mm in the reflection type color liquid crystal device of "Embodiment 1"described in the foregoing description, will be described in TABLE 1. Incidentally, when the result is that the thickness is 0 mm, the displayed color is measured by a cell in which the reflector plate and the polarizing plates are provided on the cell inner surface.

TABLE 1

| Glass Thickness (mm) | Displaying Red | | Displaying Green | | Displaying Blue | |
|---|---|---|---|---|---|---|
| | x | y | x | y | x | y |
| 0 | 0.377 | 0.337 | 0.334 | 0.400 | 0.290 | 0.282 |
| 0.1 | 0.386 | 0.337 | 0.335 | 0.411 | 0.282 | 0.272 |
| 0.2 | 0.387 | 0.337 | 0.335 | 0.413 | 0.281 | 0.270 |
| 0.3 | 0.388 | 0.337 | 0.334 | 0.414 | 0.280 | 0.268 |
| 0.4 | 0.390 | 0.336 | 0.334 | 0.416 | 0.278 | 0.266 |
| 0.5 | 0.392 | 0.336 | 0.334 | 0.448 | 0.277 | 0.264 |
| 0.55 | 0.392 | 0.336 | 0.334 | 0.419 | 0.276 | 0.263 |

TABLE 1-continued

| Glass Thickness (mm) | Displaying Red | | Displaying Green | | Displaying Blue | |
|---|---|---|---|---|---|---|
| | x | y | x | y | x | y |
| 0.7 | 0.395 | 0.336 | 0.334 | 0.422 | 0.274 | 0.261 |
| 1.1 | 0.401 | 0.336 | 0.335 | 0.429 | 0.271 | 0.255 |

This table reveals that the color purity of the displayed color is enhanced more and more with an increase in the thickness of glass. This is due to the parallax and indicates that the subtractive color mixture occurs in the range of the thickness of glass between 0 mm to 0.1 mm. The change in the color purity in the range of the thickness of glass exceeding 0.1 mm seems to be relatively faint.

Therefore, it is considered that if the thickness of glass is of the order of the magnitude of the dot pitch, the effects of the subtractive color mixture due to the parallax occur. More preferably, the thickness of the glass is 0.5 mm or so, which is about three times the dot pitch, because the color difference (between the cases of respectively displaying a primary color and white) is larger than that of the case that the thickness of the glass is 0 mm by 20% or more. In view of the relation between the dot pitch and the thickness of the substrate, it is desirable that the thickness of the substrate is set at a value which is at least about two times, more preferably, about three times the dot pitch.

Next, results of utilizing color filters, which are different in the spectral characteristic from one another, in the reflection the color liquid crystal device are shown below.

TABLE 2 and TABLE 3 describe the brightness and the displayed colors in the cases of singly displaying white, red, green and blue. In these cases, the color filters are utilized, in which the lowest transmittance is changed from 0% to 30% while the highest transmittance is maintained at 90% in the spectral characteristic corresponding to each color in FIG. 2. This measurement is also performed by using the aforementioned integrating sphere. Incidentally, the brightness is normalized by setting that of the standard white plate at 100%. Moreover, for the purpose of making comparisons, results of the measurement by using the conventional reflection type color liquid crystal device which employs the red-green-blue filter, are listed in the lowest rows of these tables. In these tables, "YCM" indicates the use of the yellow-cyan-magenta color filter; and "RGB" the use of the red-green-blue color filter.

TABLE 2

| Color Filters | Lowest Transmittance | Displaying White Y | Displaying Red Y | Displaying Green Y | Displaying Blue Y |
|---|---|---|---|---|---|
| YCM | 0% | 11.3% | 6.4% | 9.5% | 5.8% |
| YCM | 5% | 12.0% | 6.8% | 9.8% | 6.2% |
| YCM | 10% | 12.5% | 7.1% | 10.0% | 6.5% |
| YCM | 15% | 12.9% | 7.3% | 10.1% | 6.8% |
| YCM | 20% | 13.3% | 7.5% | 10.2% | 7.0% |
| YCM | 25% | 13.6% | 7.7% | 10.3% | 7.2% |
| YCM | 30% | 13.9% | 7.8% | 10.4% | 7.4% |
| RGB | 50% | 13.4% | 3.5% | 4.7% | 3.3% |

TABLE 3

| Color Filter | Lowest Transmittance | Displaying White | | Displaying Red | | Displaying Green | | Displaying Blue | |
|---|---|---|---|---|---|---|---|---|---|
| | | X | Y | X | Y | X | Y | X | Y |
| YCM | 0% | 0.331 | 0.338 | 0.402 | 0.335 | 0.334 | 0.431 | 0.268 | 0.254 |
| YCM | 5% | 0.331 | 0.338 | 0.339 | 0.336 | 0.334 | 0.427 | 0.271 | 0.258 |
| YCM | 10% | 0.331 | 0.338 | 0.395 | 0.336 | 0.334 | 0.422 | 0.274 | 0.261 |
| YCM | 15% | 0.331 | 0.338 | 0.392 | 0.337 | 0.334 | 0.418 | 0.277 | 0.265 |
| YCM | 20% | 0.331 | 0.338 | 0.388 | 0.337 | 0.334 | 0.413 | 0.280 | 0.268 |
| YCM | 25% | 0.331 | 0.338 | 0.385 | 0.338 | 0.334 | 0.409 | 0.283 | 0.272 |
| YCM | 30% | 0.331 | 0.338 | 0.381 | 0.338 | 0.334 | 0.404 | 0.286 | 0.275 |
| RCB | 50% | 0.332 | 0.339 | 0.384 | 0.384 | 0.335 | 0.409 | 0.284 | 0.272 |

As is seen from these tables, it is found that the larger the lowest transmittance of the color filter becomes, the brighter display is obtained and that however, the larger the lowest transmittance of the color filter becomes, the lighter the displayed color becomes. Incidentally, the change in the displayed color is very faint, so that it is advantageous to obtain the brighter display by raising the lowest transmittance of the color filter. Therefore, the lowest transmittance of the color filter should be 10% or more, more preferably, 20% or more.

As described above, when raising the lowest transmittance, the displayed color becomes lighter. Thus, it is desirable that the characteristic of each color filter is set so that the lowest transmittance is within the range between 15% and 25%. As a result of setting the lowest transmittance of the color filter corresponding to each color element in such a manner as to be within this range, the reflection type color liquid crystal device, which can realize the bright and clear display, is obtained.

Such results are compared with those of the measurement by using the conventional reflection type color liquid crystal device employing the red-green-blue filter. As is seen from TABLE 3, the yellow, cyan and magenta filter elements, by which the obtained displayed colors are nearly the same as those obtained by using the conventional reflection type color liquid crystal device employing the red-green-blue filter whose lowest transmittance is 50%, have the lowest transmittance of 25%. Comparisons between the brightness of the displays obtained by these devices in TABLE 2 show that when displaying white, the brightness obtained by the device according to this embodiment is almost the same as that obtained by the conventional device, and that when displaying red, green and blue, the brightness obtained by using the yellow, cyan and magenta filter elements is higher by about 2.2 times that obtained by the conventional device. This is due to the effect of turning on two dots among the three dots in each pixel in the case of the device of this embodiment.

(Embodiment 2)

A similar reflection type color liquid crystal device can be configured by utilizing STN mode.

Figure 4:
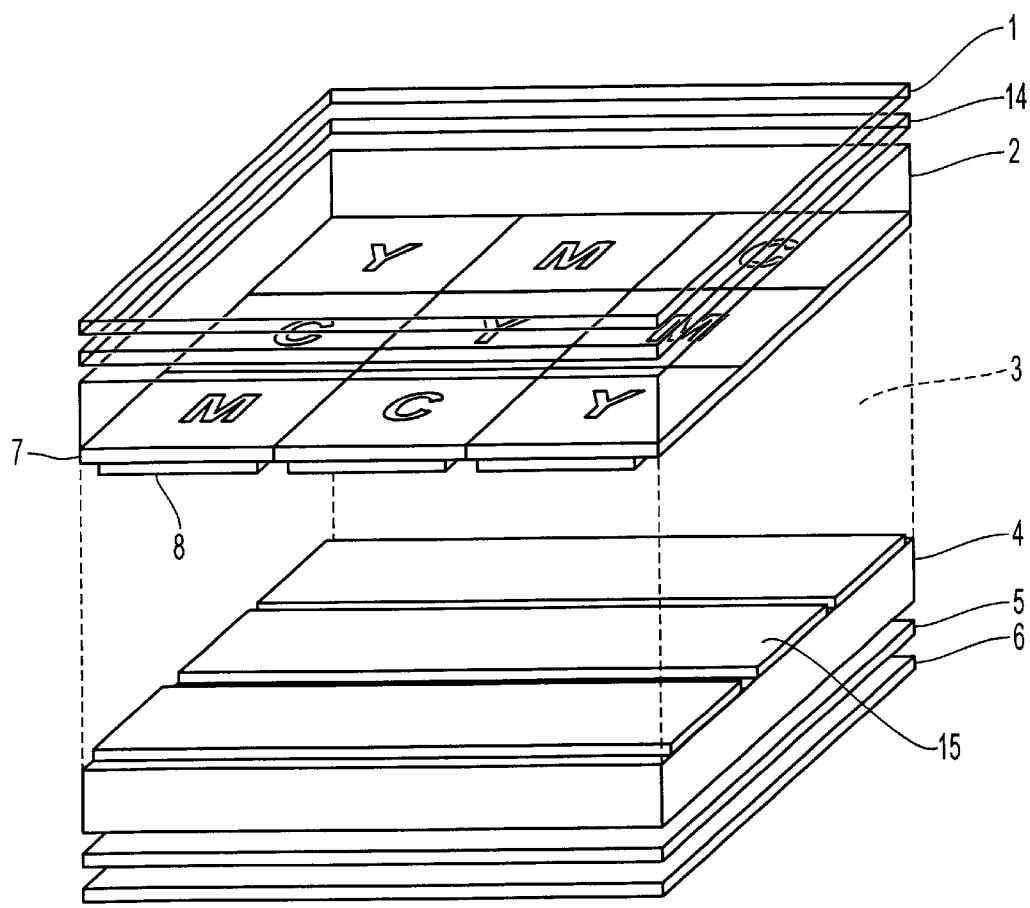
FIG. 4 is a diagram illustrating a primary part of the configuration of another reflection type color liquid crystal device of the present invention.

FIG. 4 is a diagram illustrating the primary part of the configuration of the reflection type color liquid crystal device according to the exemplary embodiment of the invention.

Reference numeral 1 denotes an upper polarizing plate; 14 a phase difference film; 2 an upper glass substrate; 3 a liquid crystal layer; 4 a lower glass substrate; 5 a lower polarizing plate; and 6 an optical reflector plate. Scanning electrodes 8 and a color filter 7 are provided on the upper glass substrate 2. Signal electrodes 15 are provided on the lower glass substrate.

Scanning electrodes 8 and signal electrodes 15 are formed by using transparent ITO. Thickness of the lower glass substrate is 0.7 mm. The dot pitch (namely, the pitch between each pair of adjacent pixels) in each of the longitudinal and transverse directions is 0.16 mm. The distance between the optical reflector plate and the color filter is 4.4 times the dot pitch.

Color filter 7 is composed of elements respectively corresponding to the subtractive primaries, namely, yellow (indicated by "Y" in this figure), cyan (indicated by "C" in this case) and magenta (indicated by "M" in this figure). Incidentally, to obtain a bright display, no black mask is formed between adjoining color filters.

Liquid crystal layer 3 is made of twisted nematic liquid crystals in which a twist angle of the liquid crystal molecule is 240°. Phase difference film 14 is constituted by a uniaxial oriented film made of polycarbonate. This is of STN mode of the phase difference compensation type proposed by the Japanese Patent Publication No. 3-50249 Official Gazette. Further, the display of black on a white background or that of white on a black background can be obtained by suitably selecting the retardation between the liquid crystal layer and the phase difference film and the relation between the axes thereof. In the case of this embodiment, when determining the conditions for compensating color stain occurring on STN type liquid crystal panel, the display of black was regarded as more important from the viewpoint that even if the color stain was slightly left in the display of white, the color stain was compensated by the color filter.

This reflection type color liquid crystal device (hereunder referred to simply as a liquid crystal panel) was driven by a multi-line driving method, by which a plurality of lines are simultaneously selected. Thus, a frame response suppressing effect was produced as disclosed in the Japanese Unexamined Patent Publication No. 6-348230 Official Gazette. Consequently, a high contrast display was obtained. Incidentally, in the case of using the driving method, by which a plurality of lines were simultaneously selected, a signal applied to the scanning electrode was established on the basis of orthogonal functions. At that time, the preferable number of the scanning electrodes is 4. Moreover, in the case of this driving method, a scanning signal to be applied to the scanning electrodes has a plurality of selection time periods. Preferably, the number of such selection time periods is 4.

Display characteristics of this embodiment is nearly equivalent to those of "Embodiment 1". However, the brightness of the display obtained by "Embodiment 2" is higher by a degree corresponding to the absence of the metallic signal line 9 illustrated in FIG. 1. Further, the displayed color in the case of this embodiment is a little lighter by a degree corresponding to the fact that the contrast obtained in this embodiment is lower than that obtained by "Embodiment 1".

(Embodiment 3)

Next, an example of a reflection type color liquid crystal device utilizing the liquid crystal display mode of the single polarizing plate type, in which polarizing plates are placed only at the light-impinging-substrate-side, will be described hereinbelow.

Figure 5:
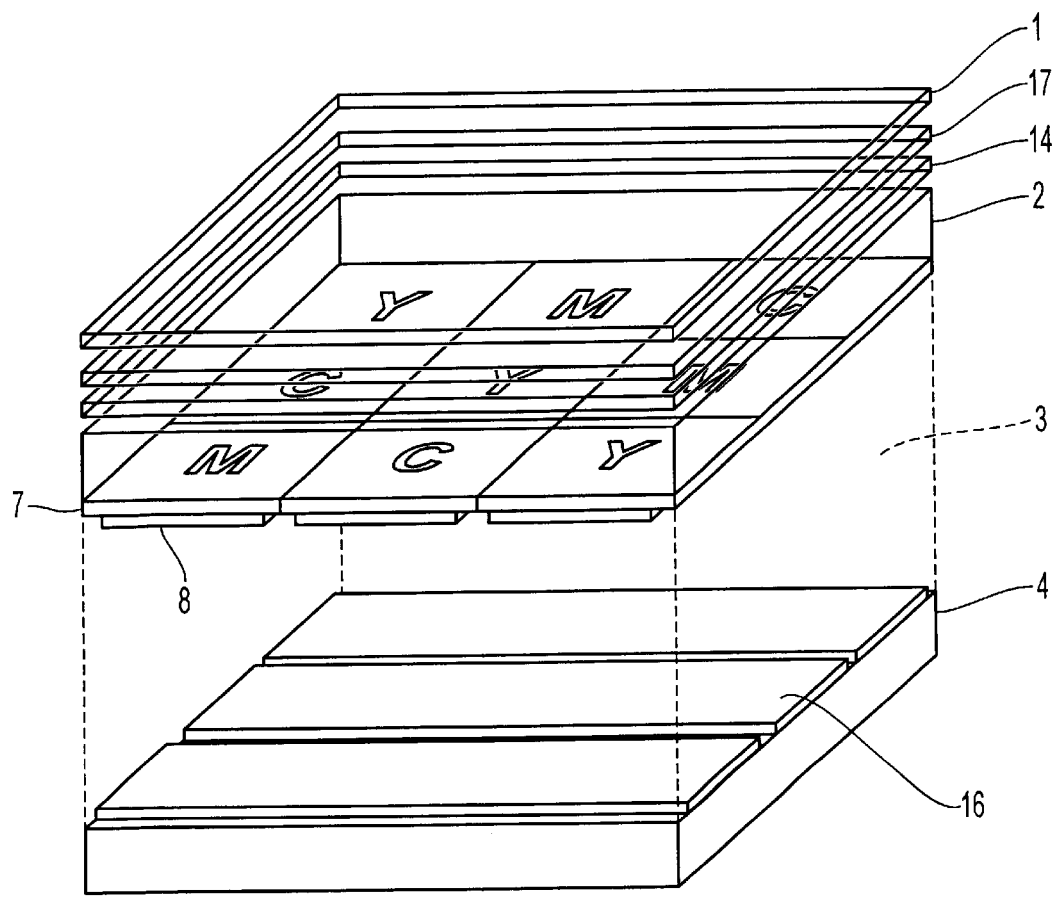
FIG. 5 is a diagram illustrating a primary part of the configuration of still another reflection type color liquid crystal device of the present invention.

FIG. 5 is a diagram illustrating a primary part of the configuration of the reflection type color liquid device according to the present invention.

Reference numeral 1 designates an upper polarizing plate; 17 a light diffusing plate; 14 a phase difference film; 2 an upper glass substrate; 3 a liquid crystal layer; and 4 a lower glass substrate.

Scanning electrodes 8 and the color filter 7 are formed on the upper glass substrate 2. Further, the signal electrodes 15 also acting as reflector plates are formed on the lower glass substrate 4. The scanning electrodes 8 are formed by using transparent ITO. Further, the signal electrodes (namely, the reflectors) 16 also serving as reflector plates are formed by using metallic aluminum. Incidentally, the reflectors 16 having mirror reflection plates are formed in this manner.

Preferably, the light diffusing plate 17 has a filler structure but does not cause a phase difference. For example, AGSI manufactured by Nitto Denko Corporation is preferable as the light diffusion plate 17. Further, in this embodiment, the light diffusion plate is provided between the polarizing plate and the upper glass substrate. The diffusion plate, however, may be provided on the polarizing plate.

Color filter 7 is composed of elements respectively corresponding to the subtractive primaries, namely, yellow (indicated by "Y" in this figure), cyan (indicated by "C" in this case) and magenta (indicated by "M" in this figure). Incidentally, to obtain bright display, no black mask is formed between adjoining color filters.

Liquid crystal layer 3 is made of twisted nematic liquid crystals in which the liquid crystal molecules are oriented in a twisted arrangement at a twist angle of 240°. Phase difference film 14 is constituted by a uniaxial oriented film made of polycarbonate. Basically, this is of the liquid crystal display mode of the phase difference compensation type proposed by the Japanese Unexamined Patent Publication No. 4-97121 Official Gazette. Further, the display of black on a white background or that of white on a black background can be obtained by suitably selecting the retardation between the liquid crystal layer and the phase difference film and the relation between the axes thereof.

Incidentally, the number of the phase difference plates is not limited to 1. To cancel the coloring peculiar to STN type liquid crystal, a plurality of phase difference plates may be provided in the device.

In the case of the device of this type, the reflector plate was provided close to the liquid crystal layer and the color filter layer. Thus, a shadow of the display (namely, a double image) can be eliminated. Moreover, the light necessarily passes through the same color filter twice, so that a bright low-color-purity color filter can be utilized. Furthermore, the light diffusion plate placed in such a manner as to be spaced from the color filter causes subtractive color mixture due to multiple reflection in a part of the device. Clearer and brighter colors can be displayed.

Incidentally, in the case of this embodiment, the driving method described in the foregoing description of "Embodiment 2", by which a plurality of lines are selected simultaneously, can be employed.

(Embodiment 4)

This embodiment is a modification of the configuration of "Embodiment 3". Namely, as illustrated in FIG. 6, the pixel electrodes (namely, the reflectors) 10 and switching elements 11 are formed on the substrate 4.

Pixel electrodes are formed in a matrix. Further, this pixel electrode is made of a metal having the reflection characteristics. For instance, aluminum, chromium and nickel may be used.

Figure 6:
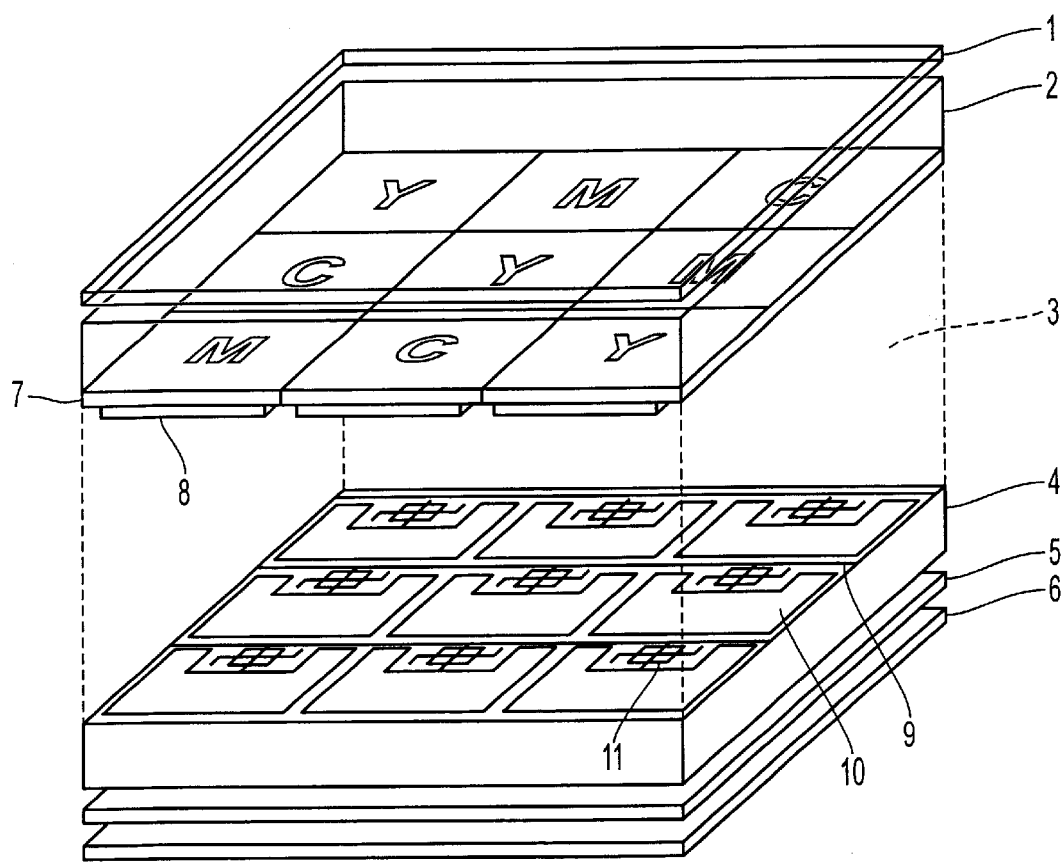
FIG. 6 is a diagram illustrating the configuration of yet another reflection type color liquid crystal device of the present invention.
Figure 7A:
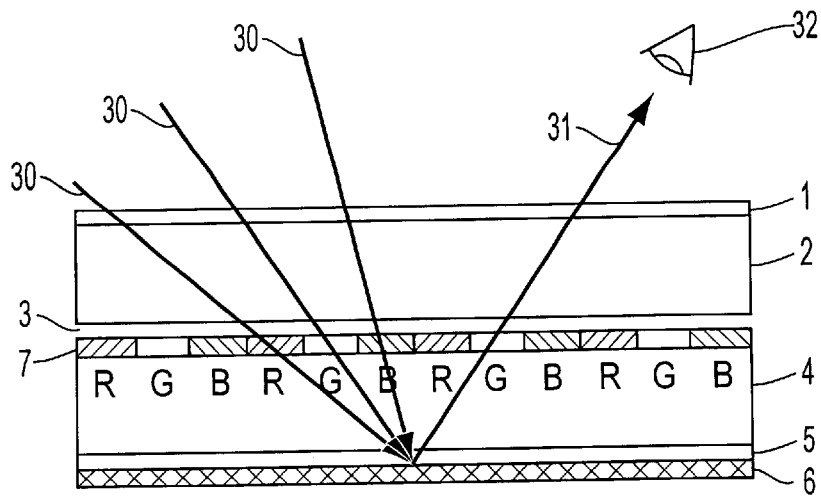
FIGS. 7(a)–(b) are a sectional view of a conventional reflection type color liquid crystal device using a red-green-blue color filter and utilizing TN mode or STN mode, which is drawn for illustrating the problems of parallax.
Figure 7B:
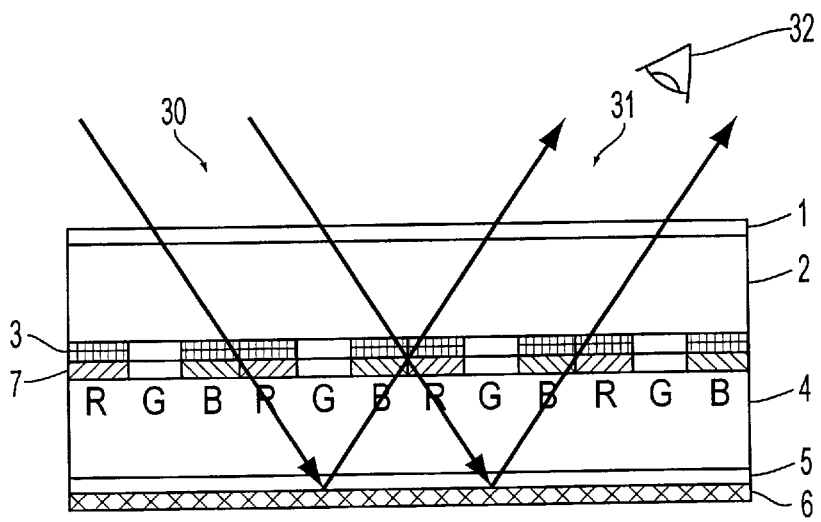

Further, as shown in FIG. 6, MIM elements are used as switching elements. Incidentally, TFT is a semiconductor substrate formed by utilizing semiconductor techniques. Reflectors are placed in such a manner as to cover the switching elements. With such a configuration, the reflectors can be formed with high precision. Especially, the surface coming in contact with the liquid crystal layer provided on the substrate is formed almost only by the reflectors. Thus, this embodiment has many reflection surfaces, so that the reflection type liquid crystal device, which is superior in respect of the reflecting characteristics can be obtained.

Incidentally, the liquid crystal layer 3 is established so that the liquid crystal molecules are oriented in a twisted arrangement at a twist angle of 90°. However, the twist angle of the liquid crystal is not limited to 90° and is sometimes set at an angle within a range of 60° to 80°. This is because the twist angle of the liquid crystal molecules is set in such a manner that light having been incident on the liquid crystal layer is changed into almost linearly polarized light on the surface of the reflector (namely, the pixel electrode). To that end, it is necessary to suitably set the product of the birefringence anisotropy of the refractive index ($\Delta n$) of the liquid crystal and the thickness (d) of the liquid crystal layer, and the twist angle.

Moreover, the color filter is formed by using the yellow, cyan and magenta elements, similarly as in the aforementioned embodiment. Furthermore, no black mask is provided so as to ensure the brightness of the liquid crystal device.

Incidentally, in the case of this embodiment, the light diffusion plate 17 is provided between the substrate 2 and the polarizing plate 1, with the intention of realizing the bright and clear display. Preferably, the light diffusion plate 17 has a filler structure but does not cause a phase difference. For example, AGSI manufactured by Nitto Denko Corporation is suitable for the light diffusion plate 17. Further, in this embodiment, the light diffusion plate is provided between the polarizing plate and the upper glass substrate. The light diffusion plate, however, may be provided on the polarizing plate.

Furthermore, in the case of this embodiment, the reflector plate is provided close to the liquid crystal layer and the color filter layer. Thus, a shadow of the display (namely, a double image) can be eliminated. Moreover, the light necessarily passes through the same color filter twice, so that a bright low-color-purity color filter can be utilized.

Namely, in the case of this device of the present application, as described in the foregoing tables, it is preferable that the lowest transmittance of all of the filter elements of the color filter consisting of the yellow, magenta and cyan filter elements is 10% or more, more preferably, 20% or more. Further, if the lowest transmittance is 30% or more, a clear display can be attained.

In the case of this embodiment, the light necessarily passes through the same color filter twice, differently from the aforesaid "Embodiment 1". Thus, a display having the color purity, the level of which is at least equal to that obtained in the device using the red-green-blue color filter, can be obtained by using the color filter whose lowest transmittance is 30% or more. Moreover, the reflection type color liquid crystal device of the present application using the color filter composed of the yellow, magenta and cyan elements can obtain a display the brightness of which is far higher than that of a display obtained by the device using the red-green-blue color filter.

Further, regarding this embodiment, the characteristic of the color filter is shown in FIG. 2 by way of example. As illustrated in this graph, a curve representing the spectrum 24 of the yellow filter element intersects with another curve representing the spectrum 26 of the magenta filter element at the wavelength in the vicinity of 500 nm. This point of intersection of the two spectra corresponds to the transmittance of nearly 50%. Further, at a wavelength in the proximity of 600 nm, a curve representing the spectrum 25 of the cyan filter element intersects with a curve representing the spectrum 26 of the magenta filter element. This point of intersection of the two spectra corresponds to the transmittance of almost 40%.

It is preferable that these two points of intersection are present in a range in which the transmittance is at least 30%. In the case of the color filter by which these two points of intersection are present in a range where the transmittance is lower than 25%, the decoloring of the light having the wavelengths corresponding to the points of intersection occurs. Thus, no clear displays are obtained. Therefore, the color filter should be designed so that the two points of intersection are present, namely, the curves representing the spectra intersect with each other in a range where the transmittance is 30% or more. More preferably, the device employs the color filter designed so that the two points of intersection are present, namely, the curves representing the spectra intersect with each other in the neighborhood of the transmittance of 35% to 60%. Thereby, a more clear display can be obtained.

Incidentally, the wavelengths corresponding to the two points of intersection are indicated by way of example in the embodiments of the present application and are thus not limited to 500 and 600 nm, respectively.

Additionally, in the case of this embodiment, the color filter is placed on the liquid-crystal-layer-side surface of the substrate 2. However, the placement of the color filter is not limited thereto. Color filter may be placed on the polarizing-plate-side surface of the substrate. With such a configuration, the parallax due to the thickness of the substrate can be utilized and a clear display can be obtained, similarly as in the case of the aforementioned "Embodiment 1".

Incidentally, an isotropic layer having optical isotropy can be placed on the inner or outer surface of the substrate.

(Embodiment 5)

In the case of driving the reflection type color liquid crystal layers described as "Embodiment 1" to "Embodiment 4", when displaying any color with the exception of black, a plurality of dots are turned on or partly illuminated among the three dots corresponding to each of the yellow, cyan and magenta.

More precisely speaking, only when displaying black, all of the three dots are non-illuminated, while all or a part of the three dots are turned on when displaying the other colors. In this case, the expression "a part of the three dots are turned on" indicates that the liquid crystal device is put into an intermediate state between the bright state and the dark state. Preferably, the brightness of a display in such an intermediate state is not less than half of the brightness of the brightest dot.

This will be described hereunder more specifically. Reflection type color liquid crystal device of "Embodiment 1" has the capability of displaying the colors in the range having vertexes 44, 48, 45, 49, 46, 47 and 44 of FIG. 3. In the case of performing the multi-color display without aiming at the reproduction of natural colors, all of the colors included in such a range may be utilized.

However, the colors corresponding to the vertexes 44, 45 and 46 are clear, but are dark because only one dot of the three dots composing each single pixel is turned on (namely, the bright display is performed on only one dot thereof). Thus, these colors are discarded, and the colors included within a triangular range having vertexes 47, 48 and 49 of this figure are displayed. In the case of these displayed colors in this range, two dots or more of the three dots corresponding to each pixel are always turned on (except in the case of displaying black). Thus, the effects of the parallax are alleviated. Consequently, the very bright display of such colors are obtained.

In the case of such a method, almost ¾ of the displayable colors are not utilized. Thus, apparently, such a method is ineffective. However, such a method is very convenient to obtain a bright display and a well-balanced color display. Especially, in the case of performing the display of colors, which are very close to natural colors, on the basis of NTSC color TV signals, this method is the most suitable one.

(Embodiment 6)

Figure 11A:
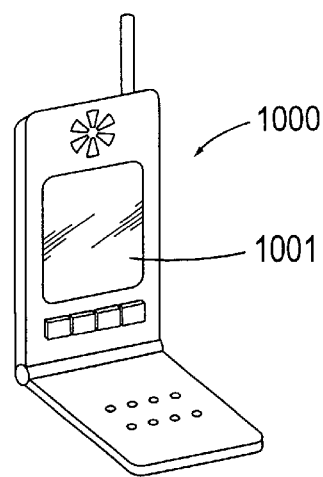
FIGS. 11(a)–(c) are a diagram illustrating an example of electronic devices, each of which is equipped with a reflection type color liquid device of the present invention.
Figure 11B:
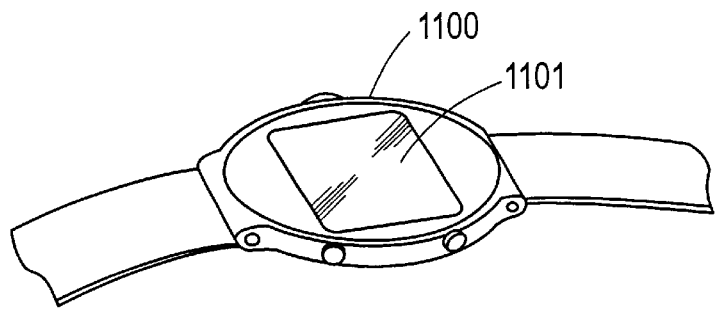
Figure 11C:
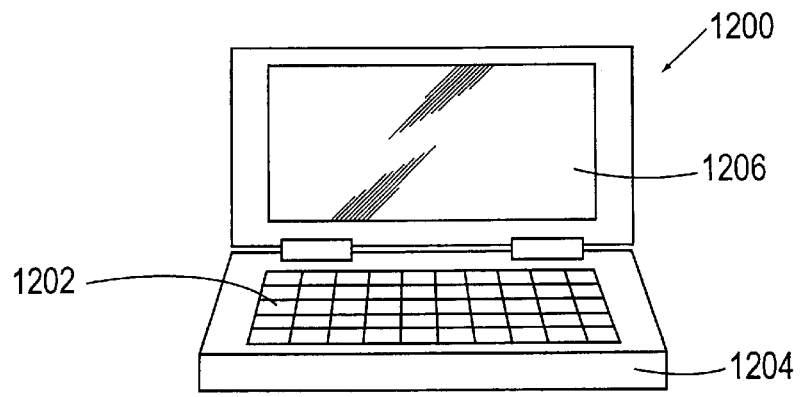

FIGS. 11(*a*)–(*c*) show external views of electronic devices respectively using the reflection type liquid crystal panels of the present invention.

FIG. 11(*a*) is a perspective view of a portable telephone. Reference numeral 1000 designates the main body of the portable telephone; and 1001 a liquid crystal display portion using the reflection type liquid crystal panel of the present invention.

FIG. 11(*b*) is a diagram or perspective view illustrating an wrist watch type electronic device. Reference numeral 1100 denotes the main body of the watch; and 1101 a liquid crystal display portion using the reflection type liquid crystal panel of the present invention.

This liquid crystal panel has high-precision pixels in comparison with the display portions of conventional wrist watches. Thus, an image displayed on the screen of TV set can be displayed thereon. Consequently, a wrist watch type TV can be realized.

FIG. 11(*c*) is a diagram illustrating the portable information processing unit such as a word processor or a personal computer. Reference numeral 1200 designates an information processing unit; 1202 an input portion such as a keyboard; 1206 a display portion using the reflection type liquid crystal panel; and 1204 the main unit of the information processing unit.

Each of these electronic devices is battery-operated. Thus, when using the reflection type liquid crystal panel which does not have a light-source lamp, the life of the battery can be increased. Further, as in the case of the device of the present invention, the peripheral circuits can be incorporated into the panel substrate. Consequently, the number of parts can be considerably decreased. Moreover, the weight and size of the device can be further reduced.

What is claimed is:

1. A reflection type color liquid crystal device including a liquid crystal cell, the reflection type color liquid crystal device comprising:

a first substrate provided with a first transparent electrode, a second substrate provided with a second transparent electrode and a color filter, a liquid crystal layer disposed between the first substrate and the second substrate, a pair of polarizing plates between which said liquid crystal cell is placed, and an optical reflector plate formed outside one of said first substrate and said second substrate, wherein said color filter comprises a yellow filter element, a cyan filter element, and a magenta filter element, and wherein each of the yellow filter element, the cyan filter element and the magenta filter element transmits more than 15% of all wavelength light in the region between 400 nm and 770 nm.

2. The reflection type color display device according to claim 1, wherein a lowest transmittance of each of the yellow filter element, the cyan filter element and the magenta filter element is set at a value greater than 20% but no more than 25% in the visible region.

3. The reflection type color liquid crystal device according to claim 1, wherein a spectrum representing a transmission characteristic of said yellow filter element intersects with a spectrum representing a transmission characteristic of said magenta filter element at a first point of intersection at a wavelength is approximately 500 nm, wherein a spectrum representing a transmission characteristic of said cyan filter element intersects with said spectrum representing a transmission characteristic of said magenta filter element at a second point of intersection at a wavelength is approximately 600 nm, and wherein the first point of intersection and the second point of intersection are present where the transmittance is more than 30%.

4. The reflection type color liquid crystal device according to claim 3, wherein the first point of intersection and the second point of intersection are present where a transmittance is 35% to 60%.

5. The reflection type color liquid crystal device according to claim 1, wherein a distance between the optical reflector plate and the color filter is larger than dot pitches.

6. The reflection type color liquid crystal device according to claim 5, wherein the distance between the optical reflector plate and the color filter is twice to three times each of the dot pitches.

7. The reflection type color liquid crystal device according to claim 1, further comprising pixel electrodes placed on one of said first substrate and said second substrate in a matrix, and a switching element connected to said pixel electrodes.

8. A color liquid crystal device including a liquid crystal cell, the color liquid crystal device comprising:

a first substrate provided with a reflector, a second substrate, a liquid crystal layer disposed between the first substrate and the second substrate, and a color filter positioned between the first substrate and the second substrate, wherein said color filter comprises a yellow filter element, a cyan filter element, and a magenta filter element, and wherein each of the yellow filter element, the cyan filter element and the magenta filter element transmits more than 15% of all wavelength light in the region between 400 nm and 770 nm.

9. The color liquid crystal device according to claim 8, wherein an optical diffusion plate is placed between the second substrate and a polarizing plate.

10. The color liquid crystal device according to claim 8, wherein a lowest transmittance is 20% or more in the visible region.

11. The color liquid crystal device according to claim 10, wherein the lowest transmittance is 30% or more in the visible region.

12. The color liquid crystal device according to claim 8, wherein a spectrum representing a transmission characteristic of said yellow filter element intersects with a spectrum representing a transmission characteristic of said magenta filter element at a first point of intersection at a wavelength is approximately 500 nm, wherein a spectrum representing a transmission characteristic of said cyan filter element intersect with said spectrum representing a transmission characteristic of said magenta filter element at a second point of intersection at a wavelength is approximately 600 nm, and wherein the first point of intersection and the second point of intersection are present where a transmittance is more than 30%.

13. The color liquid crystal device according to claim 12, wherein the first point of intersection and the second point of intersection are present where the transmittance is 35% to 60%.

14. The color liquid crystal device according to claim 8, further comprising:

an optical reflector plate formed outside one of the first and second substrates, wherein a distance between the optical reflector plate and the color filter is larger than dot pitches.

15. The color liquid crystal device according to claim 14, wherein the distance between the optical reflector plate and the color filter is twice to three times each of the dot pitches.

16. The color liquid crystal device according to claim 8, further comprising pixel electrodes placed on one of said first substrate and said second substrate in a matrix, and switching elements connected to said pixel electrodes.

17. An electronic device comprising said reflection type color liquid crystal device according to claim 1.

18. An electronic device comprising said color liquid crystal device according to claim 8.

* * * * *